United States Patent
Bloomberg et al.

(10) Patent No.: US 6,427,920 B1
(45) Date of Patent: Aug. 6, 2002

(54) HIGH FREQUENCY MASKING OF EMBEDDED DIGITAL DATA TO IMPROVE APPEARANCE

(75) Inventors: Dan S. Bloomberg, Palo Alto; Robert E. Weltman, Los Altos, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/404,961

(22) Filed: Sep. 24, 1999

(51) Int. Cl.$^7$ ............................................. G06K 19/06
(52) U.S. Cl. ................................................... 235/494
(58) Field of Search ............................... 235/494, 454, 235/487, 462.01; 382/100

(56) References Cited

U.S. PATENT DOCUMENTS

| | | | |
|---|---|---|---|
| 5,128,525 A | * | 7/1992 | Stearns et al. ............... 235/454 |
| 5,221,833 A | * | 6/1993 | Hecht ............................ 235/494 |
| 5,357,094 A | * | 10/1994 | Baldwin ........................ 234/494 |
| 5,745,589 A | * | 4/1998 | Iwai et al. .................... 382/100 |
| 5,825,309 A | * | 10/1998 | Matsui et al. ................... 341/50 |
| 5,859,920 A | * | 1/1999 | Daly et al. .................... 382/115 |
| 6,340,118 B1 | * | 1/2002 | Hecht ............................ 235/494 |

FOREIGN PATENT DOCUMENTS

JP   2000-357205 A  * 12/2000

* cited by examiner

Primary Examiner—Karl D. Frech
Assistant Examiner—Jared J. Fureman

(57) ABSTRACT

A specific bit pattern (or set of bit patterns) that have particular frequency and length requirements is used to remove low-frequency, visually observable structure from rendered embedded digital data. In use, the pattern is replicated enough times to be able to XOR with the data before rendering as glyphs, or the like. On decoding (reading), the read data is XOR'd again to recover the original data.

4 Claims, 2 Drawing Sheets

```
ORIGINAL DATA        IF PRINTED (1) 1100            // \\
    (2) 1100            // \\
    (3) 0011            \\ //
    (4) 0011            \\ //

ENCODER BITS (ODD)   1010
    (EVEN)  0101

RESULTS              PRINTED

0110            \/ /\
        1001            /\ \/
        1001            /\ \/
        0110            \/ /\
```

| ORIGINAL DATA | IF PRINTED |
|---|---|
| (1) 1100 <br> (2) 1100 <br> (3) 0011 <br> (4) 0011 |  |

| ENCODER BITS | |
|---|---|
| (ODD) | 1010 |
| (EVEN) | 0101 |

| RESULTS | PRINTED |
|---|---|
| 0110 <br> 1001 <br> 1001 <br> 0110 |  |

HIGH FREQUENCY MASKING OF EMBEDDED DIGITAL DATA TO IMPROVE APPEARANCE

BACKGROUND OF THE INVENTION

A method of randomizing digital bits or pixels to obscure low frequency patterns while preserving the data by XORing a predetermined high frequency bit pattern to the data, thereby breaking up long strings of bits of the same state.

The printing of digital bits as pixels results in patterns of 1's and 0's, usually to form an image. However, there are times when the information in the data is in the numerical content of the data, and the "image" is preferably obscured.

An example is a section of glyphs containing numerical data. A glyph is a diagonal line that slopes at one angle to indicate one state of a bit, and at a different angle to indicate the other state. Here, the information is in numerical or word form, and there is no image. The glyphs are small, and are designed to appear as a gray background. The problem is that frequent long strings of 0's or 1's in the data will show up as patterns that visibly stand out in the glyph area. It would be advantageous to be able to break up these low frequency patterns that visibly stand out without destroying any data.

Numerous patents have issued on the generation and use of glyphs, such as U.S. Pat. No. 5,245,165, Self-Clocking Glyph Code for Encoding Dual Bit Digital Values Robustly; U.S. Pat. No. 5,449,895, Explicit Synchronization for Self-Clocking Glyph Codes; and U.S. Pat. No. 5,521,372, Framing Codes for Robust Synchronization and Addressing of Self-Clocking Glyph Codes, which are incorporated by reference herein.

SUMMARY OF THE INVENTION

This invention removes most low frequency patterns in the data by combining any kind of high frequency pattern with the data. An example of a high frequency pattern would be alternate 1's and 0's, and an example of a combining function could be an XOR function. The result would be that long strings of one state would be changed into high frequency patterns, and the resultant pattern could be printed to appear as a uniform gray area.

After printing, the data could be retrieved by inverting the original function, XOR in the example. Thus, the low frequency patterns can be obscured without the loss of data.

DETAILED DESCRIPTION OF THE INVENTION

Figure 1:
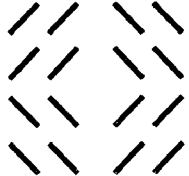
FIG. 1 shows the process of converting data between low to high frequency patterns.
Figure 1:
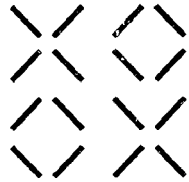

One of the great strengths of glyphs on documents is that they can be laid down with relatively unobtrusive appearance. In fact, random glyphs with center-to-center distance of 17 mils (5×5 pixels on center @ 300 dpi), when laid over normal printed matter and shown to people who have never seen such marks, are perceived as an undifferentiated uniform gray stipple, even when their attention is directed to them. However, if the glyph pattern has low-frequency content, such as repeated glyph 0's or 1's, it is remarkably easy to notice that the pattern does not appear to be uniform (such as in 45 degree glyphs on a rectangular lattice). To the extent that such low frequency patterns are removed (and hence, not observed), the appearance of the glyphs will be significantly improved.

With the standard block encoding schemes (e.g., Reed Solomon), that have been used in the past for glyphs because of their ability to correct runs of errors, the data that is encoded is unchanged by the encoding; the system just adds parity bits to it. Therefore, any non-random patterns or low-frequency data that exist in the input to be "glyphed" will appear in the glyph.

The concept is that the data to be encoded is XOR encrypted with a replicated known pattern that is devoid of low frequency. This pattern can be an n-bit word (n>16, for example). The vast majority of all n-bit words will satisfy the criterion of having little low-frequency content.

When this pattern is XOR'd, bit-by-bit, with the input data string, low-frequency patterns in the data string will be eliminated. Further, the conversion of high-frequency data patterns to low-frequency ones will only happen in the rare instances where segments of the data are identical, or nearly identical, to the XOR pattern, and are aligned with it.

The XOR encryption is performed twice. The first time, it is used on the input data before rendering into glyphs. The second time, on decoding (reading), the read data is XOR'd to recover the original input data.

The glyph data is rendered in a two-dimensional pattern. Low-frequency patterns are prevented from emerging in either the horizontal or vertical direction. Suppose the data contains many low-frequency patterns such as runs of 0s, and is laid out horizontally. Then, to prevent low-frequency vertical runs of glyphs, the XOR pattern must not have the same alignment between different rows. If the number of glyphs in a row is N, and the size of the XOR pattern is n, then we must have N mod n>0. In fact, it should be significantly larger than 0, because, for example, if N mod n=1, we could get a low frequency encrypted pattern at 45 degrees, where the same horizontal pattern is repeated from row to row, with a horizontal offset of 1 glyph per row.

To achieve the above condition, the system can either have (1) a fixed table that specifies how to choose the XOR pattern (particularly its length) from the size of the glyph region (particularly, the horizontal width, in glyphs, neglecting sync lines), or (2) a single XOR pattern chosen to have a length that is unlikely to have N mod n near 0 for most glyphs.

Satisfaction of (2) requires a long pattern. A reasonable choice for such a universal pattern would have a length that is close to, but differs sufficiently from, a large power of 2; e.g., 247.

For simplicity, the XOR encryption can be applied to all data, to the error correction parity bits, to the cyclic redundancy check sums, and any other glyphs that are not within sync lines.

FIG. 1 is a graphical description of the process. Four lines of original data in the form of bits are shown. If these were printed, as shown, in the form of glyph dots, where each dots is made up from a number of pixels, 5 pixels per dot, for example, then they would have the form shown. The individual pixels are lined up on an angle, one angle for a 1, another angle for a 0. The four original lines are seen to have a pattern that is 4 by 4 dots in size, and which may be visible on a printed page.

To break up this pattern, sets of encoder bits are used. The encoding set of bits in this example are of alternate states, and the line used for odd lines is the reverse of the one used for even lines. When the patterns of the original and encoder sets of bits are XOR'ed, the result, when printed as glyphs, is shown. It is seen that this set final set of glyphs has a higher frequency pattern of 2 by 2 dots, and will be less visible. The paper can now be read, and the encoding process run again to reverse the process to generate the original data.

Figure 2:
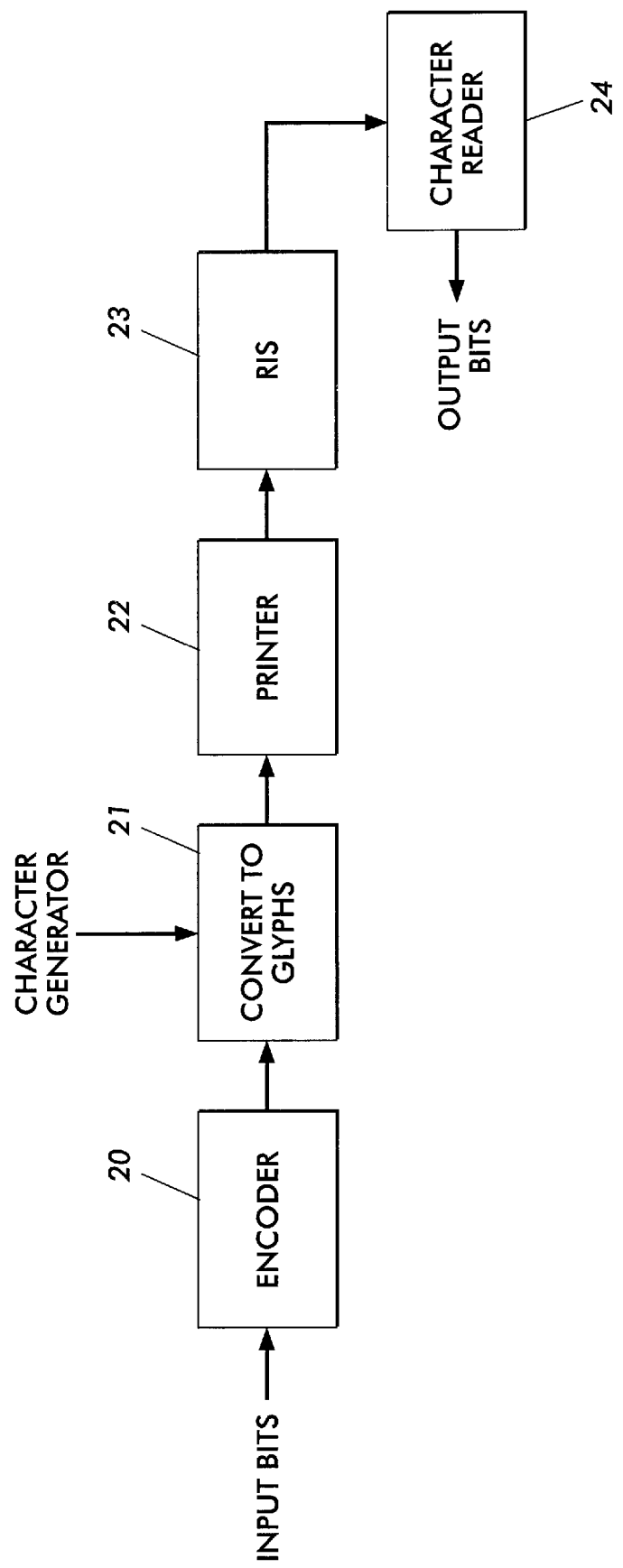
FIG. 2 is a block diagram of the system.

The system needed for this process is shown in block diagram form in FIG. 2. The input bits are sent to an encoder 20 which XOR's the input bits with the encoder bits. The resultant bits are converted to glyphs in a character generator 21 which will generate either of the two dot shapes. These are sent to a printer 22 which prints the glyphs on paper.

The paper can now be scanned by a raster input scanner 23, and the output sent to a character reader 24 which can recognize the two dot forms, and convert them to data bits, which are the same as the original input bits.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of printing an image, the image having embedded digital data comprising original bits, the method comprising:

selecting an encoding pattern of encoding bits, wherein the encoding bits have a higher pattern frequency than the original bits;

combining the original bits and the encoding bits to form encoded bits;

converting the encoded bits to encoded glyphs;

wherein the number of original bits in a row is N and the number of encoding bits is n and wherein n is chosen such that N mod n is greater than zero; and printing the encoded glyphs, wherein low frequency patterns in the printed image are obscured while preserving the embedded data in the image.

2. The method of claim 1, wherein the step of combining the original and the encoding bits comprises using an XOR function.

3. The method of claim 2, wherein the encoding pattern is different between adjacent rows.

4. The method of claim 1, wherein the encoding pattern comprises an n-bit word, where n is greater than 16.

\* \* \* \* \*